US007572475B2

(12) United States Patent
Remacle et al.

(10) Patent No.: US 7,572,475 B2
(45) Date of Patent: Aug. 11, 2009

(54) EGGS WITH BALANCED LIPID COMPOSITION

(75) Inventors: Claude Remacle, Loyers (BE); Jacques Lignian, Bastogne (BE); Thomas Erpicum, Seraing (BE); Fabien De Meester, Marche (BE); Luc Coucke, Waregem (BE); Jeong Sim, Edmonton (CA); Christian Schmidt, Vielsam (BE)

(73) Assignee: Belovo, Bastogne (BE)

( * ) Notice: Subject to any disclaimer, the term of this patent is extended or adjusted under 35 U.S.C. 154(b) by 162 days.

(21) Appl. No.: 10/258,891

(22) PCT Filed: May 15, 2001

(86) PCT No.: PCT/BE01/00084

§ 371 (c)(1),
(2), (4) Date: Jan. 24, 2003

(87) PCT Pub. No.: WO01/87091

PCT Pub. Date: Nov. 22, 2001

(65) Prior Publication Data

US 2004/0022924 A1    Feb. 5, 2004

(30) Foreign Application Priority Data

May 18, 2000    (EP)    ................................. 00870109

(51) Int. Cl.
*A23L 1/32*    (2006.01)
(52) U.S. Cl. ...................................... 426/614; 426/601
(58) Field of Classification Search ................ 426/614, 426/601, 613
See application file for complete search history.

(56) References Cited

U.S. PATENT DOCUMENTS

| 5,869,530 A | | 2/1999 | Ponroy |
| 5,897,890 A | * | 4/1999 | Scheideler ..................... 426/2 |
| 6,103,276 A | | 8/2000 | Pilgrim et al. |
| 6,217,926 B1 | * | 4/2001 | Merkle et al. ................ 426/425 |

FOREIGN PATENT DOCUMENTS

| DE | 43 14 899 | | 12/1993 |
| EP | 0775449 | * | 5/1997 |
| EP | 0 803 199 | | 10/1997 |
| EP | 1 155 627 A1 | | 11/2001 |
| WO | WO95/21539 | | 8/1995 |
| WO | WO97/10723 | | 3/1997 |
| WO | WO 01/87091 A1 | | 11/2001 |

OTHER PUBLICATIONS

U.S.D.A. Egg Fact sheet. 2007. http://www.enconline.org. 2007. Author unknown.*

Eder. "Laying performance and fatty acid composition of egg yolk lipids of hens fed diets with various amounts of ground or whole flaxseed". *Archive fur Geflugelkunde*, vol. 62, No. 5, pp. 223-238 (1998).

Cherian et al. "Omega-3 fatty acid and cholesterol content of newly hatched chicks from alpha-linolenic acid enriched eggs". *Lipids*, vol. 27, No. 9, pp. 706-710 (1992).

An. "Effects of dietary fat sources containing omega 3 or omega 6 polyunsaturated fatty acids on fatty acid composition of egg yolk in laying hens". *Korean Journal of Animal Science*, vol. 41, No. 3, pp. 293-310 (1999) and English abstract.

Van Elswck. "Nutritional and physiological effects of flax seed in diets for laying fowl". *World's Poultry Science Journal*, vol. 53, No. 3, pp. 253-305 (1997).

Danicke et al. "Influence of graded levels of rape seed in laying hen diets on the fatty acid composition of the yolk fat". *Fett Widdenschaft Technologie*, vol. 97, No. 5, pp. 194-199 (1995) and English abstract.

Farrell. "The enrichment of poultry products with the omega n-3 polyunsaturated fatty acids: a selected review". *Proceedings of Australian Poultry Science Symposium*, vol. 7, pp. 16-22 (1995).

Crawford et al. "The food chain for n-6 and n-3 fatty acids with special reference to animal products". In Galli et al. (Eds.), *Dietary Omega-3 and Omega-6 Fatty Acids-Biological Effects and Nutritional Essentiality*, NATO ASI Serias A: Life Sciences, vol. 171, pp. 5-19, Plenum Press, New York (1989).

Simopoulos. "Omega-3 fatty acids in health and disease and in growth and development". *American Journal of Clinical Nutrition*, vol. 54, pp. 438-463 (1991).

Galli et al. "General recommendations on dietary fats for human consumption". In Galli et al (Eds.), *Dietary Omega-3 and Omega-6 Fatty Acids-Biological Effects and Nutritional Essentiality*, NATO ASI Series, pp. 403-404, Plenum Press, New York (1988).

Lands. "The two faces of essential fatty acids". *Inform*, vol. 8, No. 11, pp. 1141-1147 (Nov. 1997).

Sugino et al. "General chemical compositions of hen eggs". In Yamamoto et al. (Eds.). *Hen Eggs, Their Basic and Applied Science*, Chapter 2, pp. 13-24, CRC Press Inc. (1997).

Milner. "Functional foods and health promotion". *Journal of Nutrition*, vol. 129, No. 7S, pp. 1395S-1397S (1999).

Huyghebeart. "Incorporation of polyunsaturated fatty acids in egg yolk fat at varying dietary fat levels and compositions". *Archive fur Geflugelkunde*, vol. 59, No. 2, pp. 145-152 (1995).

(Continued)

*Primary Examiner*—Anthony Weier
(74) *Attorney, Agent, or Firm*—McAndrews, Held & Malloy, Ltd.

(57) ABSTRACT

The present invention is related to an egg obtained from a domesticated bird, in particular a layer, having a lipid fraction balanced in ω6 and ω3 fatty saturated fatty acids according to the ratio of polyunsaturated/saturated fatty acids=1:1±10%. The present invention is also related to a feed composition of exclusive vegetarian origin and suitable for poultry and a method for obtaining such egg from said poultry animals.

9 Claims, No Drawings

OTHER PUBLICATIONS

Sim, J.S., "Designer Eggs and Their Nutritional and Functional Significance." World Rev. Nutr. Diet. 83 89-101 (1998).

Sim, J.S., Cherian, G., and Jiang, Z., "a-Linolenic Acid Metabolism: the Chicken and the Egg." Nutrition 8: 221-222 (1992).

Jiang, Z., and Sim, J.S., Effects of Dietary n-3 Fatty Acid-Enriched Chicken Eggs on Plasma and Tissue Cholesterol and Fatty Acid Composition of Rats. Lipids 27: 279-284 (1992).

Jiang, Z., Ann, D.U., and Sim, J.S., "Effects of Feeding Flax and Two Types of Sunflower Seeds on Fatty Acid Compositions of Yolk Lipid Classes", Poultry Science 70: 2467-2475 (1991).

Cherian, G., Wolfe, F.W., and Sim, J.S., "Dietary Oils with Added Tocopherols: Effects on Egg or Tissue Tocopherols, Fatty Acids, and Oxidative Stability." Poultry Science 75: 423-431 (1996).

Sunwoo, H.H., Wolfe, F.H., and Sim, J.S., "Effects of Dietary a-Linolenic Acid and Strain of Hen on the Fatty Acid Composition, Storage Stability, and Flavor Characteristics of Chicken Eggs." Poultry Science 74:140-147 (1995).

Cherian, G., Gopalakrishnan, N., Akiba, Y., Sim, J.S., "Effect of Maternal Dietary n-3 Fatty Acids on the Accretion of Long-Chain Polyunsaturated Fatty Acids in the Tissues of Developing Chick Embryo." Biol. Neonate 72: 165-174 (1997).

Oh, S.Y., Ryue, J., Hsieh, C.-H., and Bell, D.E., "Eggs enriched in w-3 fatty acids and alterations in lipid concentrations in plasma and lipoproteins and in blood pressure." Am. J. Clin.Nutr. 54: 689-695 (1991).

Scheideler, S.E., and Froning, G.W., "The Combined Influence of Dietary Flaxseed Variety, Level, Form, and Storage Conditions on Egg Production and Composition Among Vitamin E-Supplemented Hens." Poultry Science 75: 1221-1226 (1996).

Botsoglou, n. A. Yannakipoulos, a.L., Fietouris, D.J., Tserveni-Goussi, a.S., and Psomas, I.E., "Yolk Fatty Acid Composition and Cholesterol Content in Response to Level and Form of Dietary Flaxseed." J. Agric. Food Chem. 46: 4652-4656 (1998).

Internet-printout from en.wikipedia.org regarding the term "alpha-linolenic acid".

Pufa Newsletter, Jun. 2003, Cardiovascular Disease: Stearldonic Acid: a Novel Omega-3 Fatty Acid.

Internet-printout from de.wikipedia.org regarding the term "Lincisaure"; and English translation.

Pufa Newsletter, Jun. 2004, Frontiers: Long-Chain PUFAs Produced in Transgenic Cress, Arabidopsis Thaliana.

Internet-printout from de-wikipedia.org regarding the term "Eicosapentaensaure"; and English translation.

Internet-printout from en.wikipedia.org regarding the term "docosapentaenoic acid".

Internet-printout from de.wikipedia.org regarding the term "Docosahexaensaure"; and English translation.

Intenet-printout from en.wikipedia.org regarding the term "Essential fatty acid".

Internet-printout from de.wikipedia.org regarding the term "Essentielle Stoffe"; and English translation.

Beare-Rogers, J., Dieffenbacher, A., and Holm, J.V., "Lexicon of Lipid Nutrition." Pure Appl. Chem. 73: 858-744 (2001).

Internet-printout from www.aeb.org/LearnMore/Eggcyclopedla/F.htm regarding the fat content of eggs.

Notice of Opposition to EP1282367.

Applicants Response to Notice of Opposition to EP 1282387.

Suzuki et al., "Effect of an Increase of Dietary Linseed Oil on Fatty Acid Composition and α-Locopherol in Hen's Egg Yolk", Journal of Japanese Society of Nutrition and Food Science, v. 47(1), pp. 23-27.

Suzuki et al., "Effect of an Increase of Dietary Linseed Oil on Fatty Acid Composition and α-Locopherol in Hen's Egg Yolk", Journal of Japanese Society of Nutrition and Food Science, v. 47(1), pp. 23-27 (English translation).

* cited by examiner

EGGS WITH BALANCED LIPID COMPOSITION

FIELD OF THE INVENTION

The present invention relates to wild- or game-type eggs having an improved balanced lipid composition and which are compatible with modern recommendations to healthy dietary habits, and a method of feeding birds, in particular layers, that can be maintained under various rearing conditions (intensive, barn, plein air, free range, etc.) for the production of such eggs.

The significance of abbreviations used hereafter can be found in the part entitled "List of abbreviations".

BACKGROUND OF THE INVENTION AND STATE OF THE ART

Evolution of Human Diet

For many years, food available from vegetable and animal sources was low in fat (less than 25% of total energy intake), for it was of a wild type and because it was mostly eaten raw or grilled. It was source of about equal amount of saturated and polyunsaturated fatty acids as well as of $\omega 6$ and $\omega 3$ isomers (P:S=$\omega 6$:$\omega 3$=1:1).

When rudimentary agriculture began to slowly bring changes in dietary habits, making food from animal origin (meat, fish, milk, eggs) more present in the daily diet, the contribution of cholesterol and saturated fatty acids to the total fat content proportionally increased.

However, the $\omega 6$:$\omega 3$ ratio remained relatively constant because traditional animal husbandry and fish culture did not widely differ in terms of feeding from former wild-type life, i.e. because the animals had large access to green-leaf vegetables (livestock) and phytoplanktons (fish).

Deviations from human food standards came readily into prominence at the turn of the century with the emergence of the modern agriculture and vegetable-oil industry.

Emphasis on $\omega 6$-rich grains fattening of domestic livestock and fishery and on partial selective hydrogenation of $\omega 3$-rich vegetable oils results in a dramatic decrease in the amount of $\omega 3$ fatty acids available to humans and to a not-less dramatic increase in the contribution of total fat and trans fatty acids to the daily energy supply of the human diet.

The drastic deviation operated some 150 years ago in human food habits changed the $\omega 6$:$\omega 3$ ratio that was about 1:1 during the evolutionary period to a now estimated imbalance of about 10-11:1 for food from vegetable source and closer to 20-25:1 for mixed food from vegetable and animal sources. Meanwhile, the human genetic constitution remained relatively unchanged and did not cope with this brutal pace of change in the food chain.

TABLE 1

| | Time (years) | | | | |
|---|---|---|---|---|---|
| | −4.000.000 | −10.000 | 1850 | 1950 | 2000 |
| Total fat | | 25% | 30% | 35% | 40% |
| P:S | | 1:1 | 0.9:1 | 0.75:1 | 0.5:1 |
| $\omega 6$:$\omega 3$ | | 1:1 | | 10:1 | 20:1 |

Table 1 gives a scheme of the relative contribution of different dietary fatty acids (saturated fatty acids, $\omega 6$ and $\omega 3$ polyunsaturated fatty acids) to the human diet and possible changes subsequent to modern agriculture and industrial food processing, involving fattening of animal husbandry and hydrogenation of fatty acids.

In the meantime, wild animals, which were still left grating on green leaves and wild plant seeds, continued to exhibit balanced essential fatty acid ratio's in their fat depots, independently from the species they belong to (Crawford, M. A. et al. (1989) "The food chain for n-6 and n-3 fatty acids with special reference to animal products", in Dietary $\omega 3$ and $\omega 6$ Fatty Acids—Biological Effects and Nutritional Essentiality (Galli, C. & Simopoulos, A. P., eds) NATO ASI Series A: Life Sciences Vol. 171, pp.5-19, Plenum Press, New York, ISBN 0-306-43231-5).

Link with Modern Degenerative Diseases

Today, $\omega 6$ and $\omega 3$ PUFA are known to be essential in minimum amounts (see table 2 for adequate intake) for normal growth and development of humans. Their relative concentration or fractional ratio ($\omega 6$:$\omega 3$) in food regulates the in vivo metabolism of lipoproteins, the fatty acid composition of cell membranes and the synthesis of some important biological mediators, the eicosanoids, which are essential to cell communication and global homeostasis. Scientific evidences suggest that at least some human degenerative diseases have a food link and that the highly unbalanced modern dietary $\omega 6$:$\omega 3$ ratio, as well as the strong contribution of total fats (more than 35% of total energy intake) and of saturated fatty acids (P:S=0.5:1, including trans isomers) to the daily energy intake, may well have a direct implication into the appearance of some characteristic diseases of our modern society, i.e., cerebro- & cardiovascular diseases, coronary heart affections, cancers, diabetes, high blood pressure, chronic inflammatory and auto-immune diseases. More specifically, arachidonic acid, the $\omega 6$ long-chain fatty acids derived from linoleic acid and/or obtained directly from food of animal origin, has been shown to effectively accumulate in modern man tissues when ingested in excess (A. T. Simopoulos (1991) Omega-3 fatty acids in health and disease and in growth and development, Am. J. Clin. Nutr. 54, 438-463). Consequently, arachidonic acid-derived eicosanoids have taken the lead in cell and tissue behaviour of modern man with all the deleterious consequences for health.

Scientific and epidemiological evidence seems to confirm that excess $\omega 6$ fatty acids in modern man diet could well be one of the major culprit for reduced health performance in ageing.

The "Balanced Diet" Notion

Galli & Simopoulos ("General recommendations on dietary fats for human consumption", in Dietary $\omega 3$ and $\omega 6$ Fatty Acids Biological Effects and Nutritional Essentiality (Galli, C. & Simopoulos, A. P., eds) pp. 403-404, North Atlantic Treaty Organisation Advanced Science Institute Series, Plenum Press, New York & London (1988)) defined a well-balanced diet as one that, among other things, provides max. 30% energy as fat together with a large proportion of monounsaturated fatty acids, an even distribution of saturated and polyunsaturated fatty acids (S:M:P=1:6:1), a ratio between $\omega 6$ and $\omega 3$ isomers not exceeding 5 to 1 ($\omega 6$:$\omega 3 \leq 5$:1), and an optimal amount of 350-400 mg $\omega 3$ long chain polyunsaturated fatty acids ($\omega 3$ LC-PUFA).

In a recent workshop held at The Cloisters, National Institute of Health (NIH) in Bethesda, Md., USA, Apr. 7-9, 1999, an Expert Panel led by Prof. A. T. Simopoulos established the following adequate intakes for $\omega 6$ and $\omega 3$ fatty acids in adults (table 2).

TABLE 2

Adequate Intakes (AI) for Adults

| Fatty Acid | Abbrev | Formula | Grams/day* | Cal/day | % total cal. |
|---|---|---|---|---|---|
| Linoleic acid | LA | C18:2ω6 | 4.44 | 40 | 2 |
| α-linolenic acid | LnA | C18:3ω3 | 2.22 | 20 | 1 |
| EPA + DHA | ω3 LCP | C20/22:5/6ω3 | 0.44 | 4 | 0.2 |

*2000 kcal diet

It is seen that there is a clear trend towards re-adopting the historically-established, naturally-occurring lipid ratios settled by Nature 4 million years ago as those which must be optimally fit for human consumption. Quite remarkably, these modern recommendations for amounts and ratios of lipids in human diet are based on meta-analysis of epidemiological and clinical studies of the long term relationship between dietary habits and degenerative diseases in human.

Optimum dietary lipid pattern can be reached through substitution of ω6-rich for ω3-rich vegetable oils and enrichment of modern-type diets with greens, leaves and fish, but enrichment does in fine mean adding-up on fat.

Ideally, edible animal tissue lipids should also comply with these scientifically established evidence since pre-formed arachidonic acid from animal origin is known to incorporate very effectively in tissue lipids (Lands, W. E. M. (1997) Two faces of EFA, Inform 8, 1141-1147). Essentially, there is no scientific evidence for a need in dietary arachidonic acid in normal people. A very important aspect of wild-type animal tissue is that they favour ω3 versus ω6 long-chain phospholipids and contain substantially lower amount of arachidonic acid in comparison to their domesticated equivalent.

Scientifically and naturally established evidences suggest that healthy food from animal origins is of the wild or game-type, lean and balanced in essential fatty acids, low in arachidonic acid.

Eggs as Food

Eggs are generally recognised as source of highly bioavailable and valuable nutrients.

As a source of essential amino-acids, eggs are remarkable in that they are in perfect agreement with adult human needs; they are also a rich source of beneficial branched amino-acids (table 3).

TABLE 3

Essential amino-acids in eggs and human needs

| Essential amino acids | (+)mg/100 g (two 60-g eggs) | **RDA (mg) 70-kg adult |
|---|---|---|
| Histidine | 275 | — |
| *Isoleucine | 675 | 840 |
| *Leucine | 1075 | 1120 |
| Lysine | 875 | 840 |
| Cysteine + Methionine | 712.5 | 700 |
| Tyrosine + Phenylalanine | 1162.5 | 1120 |
| Threonine | 587.5 | 560 |
| Tryptophan | 212.5 | 210 |

TABLE 3-continued

Essential amino-acids in eggs and human needs

| Essential amino acids | (+)mg/100 g (two 60-g eggs) | **RDA (mg) 70-kg adult |
|---|---|---|
| *Valine | 825 | 980 |
| Lysine | 1.23 | 1.20 |
| Cysteine + Methionine | | |

*BCAA: branched chain amino-acids
**RDA: recommended dietary allowances (National Academy of Sciences, U.S.A., 1974)
(+)FAO Food and Nutrition Paper 51(1990) Protein quality evaluation (Content in mg/g protein × 12.5)

Carbohydrates mainly appear in eggs as glucose and glycoproteins (table 4).

TABLE 4

Carbohydrates in eggs

| | mg / 100 g (two 60-g eggs) | | |
|---|---|---|---|
| | Albumen (68-g) | Yolk (32-g) | Total (100-g) |
| Free sugar* | 260 | 260 | 520 |
| Oligosaccharides** | 330 | 110 | 440 |
| Total | 590 | 370 | 960 |

*mainly D-glucose -
**N- & O-glycans in albumen, sialoglycans in yolk (Sugino, H., Nitoda, T. and Juneja, L. R. (1997) General Chemical Composition of Hen Eggs, in "Hen Eggs, Their Basic and Applied Science" (Yamamoto, T., Juneja, L. R., Hatta, H. & Kim, M. eds) CRC Press Inc., Ch. 2, pp. 13-24).

Lipids in egg yolk appear as a mixture of neutral and polar lipids; their fatty acids are either long (C16-18) or very long (C20-22) carbon chains (table 5).

TABLE 5

Lipids in eggs

| | g / 100 g (two 60-g eggs) | | | |
|---|---|---|---|---|
| Lipid fractions | Triglycerides | Phospholipids | Cholesterol | Total |
| Weight contribution | 6, 9 | 2, 7 | 0, 430 | 10 |
| % fatty acid | 96 | 72 | ~0 | 85.5 |
| Fatty acids type | C16-C18 | C16-C22 | — | C18 |

Vitamins and minerals are omnipresent at relatively high concentration in eggs (table 6).

TABLE 6

Vitamins, minerals and oligoelements in eggs and human needs

| Vitamins | | Name | RDI* | 100 g-egg | % RDI |
|---|---|---|---|---|---|
| Vit. A | a | Retinol | 1.5150 | 0.1921 | 12.7 |
| *Vit. D | b | Calciferol | 0.0100 | 0.0012 | 12.0 |
| Vit. E | c | Alpha-tocopherol | 20.0000 | 1.4000 | 7.0 |
| *Vit. K1 | | Phylloquinone | | | |
| Vit. B1 | | Thiamin | 1.5000 | 0.0620 | 4.1 |
| Vit. B2 | | Riboflavin | 1.7000 | 0.5080 | 29.9 |
| *Vit. B3 (Pp) | d | Niacin | 20.0000 | 0.0740 | 0.4 |
| *Vit. B5 | | Panthotenic acid | 10.0000 | 1.2540 | 12.5 |

TABLE 6-continued

Vitamins, minerals and oligoelements in eggs and human needs

|   |   |   | 2000 Cal | 100 g-egg | % RDI |
|---|---|---|---|---|---|
| Vit. B6 |   | Pyridoxin | 2.0000 | 0.1400 | 7.0 |
| Vit. B8 (H) |   | Biotin | 0.3000 | 0.0200 | 6.7 |
| Vit. B9 (M) |   | Folic acid | 0.4000 | 0.0460 | 11.5 |
| Vit. B12 |   | Cyanocobalamine | 0.0060 | 0.0010 | 16.7 |
| Vit. C | e | Ascorbic acid | 60.0000 |   |   |

| Minerals | Name | 2000 Cal | 100 g-egg | % RDI |
|---|---|---|---|---|
| Ca | Calcium | 1000 | 50.0 | 5.0 |
| P | Phosphorus | 1000 | 178.0 | 17.8 |
| Mg | Magnesium | 400 | 10.0 | 2.5 |
| Na | Sodium |   | 126.0 |   |
| Cl | Chlorine |   | 174.2 |   |
| K | Potassium |   | 120.0 |   |
| S | Sulfur |   | 164.0 |   |

| Oligo | Name | 2000 Cal | 100 g-egg | % RDI |
|---|---|---|---|---|
| Fe | Iron | 18.00 | 1.440 | 8.0 |
| Zn | Zinc | 15.00 | 1.100 | 7.3 |
| Se | Selenium |   |   |   |
| Cu | Copper | 2.00 | 0.014 | 0.7 |
| I | Iodine | 0.15 | 0.048 | 32.0 |
| Mn | Manganese |   | 0.024 |   |
| Mo | Molybden |   |   |   |

All numbers in mg; 100-g eggs stands for the edible part of two 60-g-eggs
RDI: Reference Daily Intake = average values for healthy Americans over 4-y-old
RDI* given for a 2000 Cal-diet
*accessory- or conditionally essential nutrient
a) retinol equivalent: 1 mcg retinol/β-caroten or 3.3 IU
b) calciferol: 1 mcg or 40 IU
c) alpha-tocopherol equivalent (α-TE): 1 mg d-alpha-tocopherol or 1.49 IU
d) niacin equivalent: 1 mg nicotinic acid (or nicotinamide) or 60 mg tryptophan
e) ascorbic or dehydroascorbic acid The weight-distribution of amino-acids, carbohydrates and lipids is genetically encoded in eggs whilst that of vitamins, minerals and fatty acids is sensitive to their concentration in the bird's diet.

The egg lipid composition has often been criticised in terms of its relatively high concentration in saturated fatty acids and cholesterol compared to total energy content. The scientifically-proven relationship (known as the "lipid hypothesis") between high dietary CSI (cholesterol-saturated fat index) and relatively higher risk of cardio- and cerebrovascular diseases has often supported the critical evaluation of cholesterol content in food. Cell membranes of animal tissues differ from those of plant tissues in that they contain cholesterol and phospholipids bearing long chain polyunsaturated fatty acids. Egg yolk lipids conform to this rule: cholesterol and long-chain polyunsaturated fatty acids happen to appear in a ratio close to 1:1 (0.5 mM each in egg yolk) and the latter occur at the characteristic sn-2 position of tissue phospholipids. There is thus nothing special or "wrong" about the cholesterol level in egg—it just has to do with its primary function, i.e. to support the development of Life in avian. Cholesterol in egg yolk is almost a constant whatever the type of feed served to the chicken. However, the content of polyunsaturated fatty acids can be increased at the expenses of that of saturated and monounsaturated fatty acids by simple dietary means.

While amounts of saturated, mono-unsaturated, ω3 and ω6 polyunsaturated fatty acids have been separately varied in previous egg production and the effect of these minor changes on human blood lipid balanced were already described, eggs wherein all fatty acid and lipid fractions are controlled to result in a product which is compatible with a healthy diet defined as that one designed by Nature in the wild, were never produced nor described.

Aims of the Invention

The present invention aims to provide eggs obtained from domesticated birds, in particular layers, said eggs comprising an improved lipid balanced profile in order to result in a product compatible with healthy diet for humans and animals comparable to the one designed by nature in the wild.

Another aim of the present invention is to provide such safe and improved eggs and food compositions comprising such eggs that may be consumed as part of a balanced diet in reasonable quantity, as recommended by national and international heart foundations, and that sustain consumer's health in the long term.

A further aim of the present invention is to provide a feed composition of exclusive vegetarian origin and a feeding method for poultry, in particular layers, from which said eggs having an improved lipid balanced profile may be obtained.

A last aim of the present invention is to provide such feed composition and feeding method for feeding poultry, in particular layers, that can be maintained in various conditions for the production of such eggs.

SUMMARY OF THE INVENTION

The inventors have discovered that it is possible to obtain eggs from domesticated birds, preferably chicken eggs, having an advantageous lipid profile which complies with that of fat depots of wild- or game-type animals, that is balanced in saturated (30%) and polyunsaturated (30%) and is balanced in omega-6 (15%) and omega-3 (15%) fatty acids. Said eggs will be hereafter called wild-type or game-type eggs.

More precisely, the eggs according to the invention has a lipid fraction balanced in seed and green plant-type ω6 and ω3 fatty acids according to the ratio of seed plant-type ω6 fatty acids:green plant-type ω3 fatty acids=1:1±10%.

The eggs according to the invention is also characterised in that their lipid fraction is balanced between polyunsaturated and saturated fatty acids according to the ratio of polyunsaturated:saturated fatty acids=1:1±10%.

The eggs according to the invention may be consumed or incorporated in food compositions in reasonable quantities as part of a balanced diet, these food compositions sustaining consumer health in the long term. They may be used as a functional food or as medicament (see for reference Milner J. A., *Journal of Nutrition* (1999), Volume 129, Number 7S, "Functional foods and health promotion", pages 1395S-1397S).

The phospholipid fraction in said eggs is also characterised by an advantageous balanced fraction of animal-derived long chain fatty acids: omega-6 (ω6):omega-3 (ω3) fatty acids equal to 1:3±10%.

Advantageously, the balanced lipid fraction of the eggs is made of green plant-type and animal-derived omega-3 (ω3) fatty acids, characterised by the preferred following ratio, plant-type ω3 fatty acids:animal-derived ω3 fatty acids equal to 5:1±10%, a ratio similar to that recently proposed by the NIH Expert Panel for adequate intake of ω3 fatty acids of plant and animal origins in human (table 2).

Preferably the eggs according to the invention have more than 450 mg/egg (about 550±50 mg/egg) of green plant-type fatty acids omega-3 (ω3) and have more than 90 mg/egg (about 110±10 mg/egg) of animal-derived ω3 fatty acids.

Advantageously, the eggs according to the invention contain no more than about 40 mg/egg, preferably about 35±5 mg/egg, animal-derived omega-6 (ω6) fatty acids and is essentially arachidonic acid.

Advantageously, the animal-derived omega-3 (ω3) fatty acids contained in the eggs according to the invention are C20 and C22 fatty acids, preferably selected from the group consisting of eicosapentaenoic acid docosapentaenoic acid and docosahexaenoic acid.

Advantageously, said eggs contain about 10±2 mg eicosapentaenoic acid/egg, about 15±3 mg docosapentaenoic acid/egg and about 75±15 mg docosahexaenoic acid/egg.

Advantageously, the wild-type lipid profile of such eggs automatically results in an enrichment in vitamins, especially vitamin E with 20 mg/% of the edible part, and in a reduction of about 10% in their C12, 14, 16 and 18 saturated fatty acid content, with no more than 2.50 g/% of the edible part, the cholesterol content of said eggs being no more than 375 mg/% of the edible part.

The wild-type lipid profile of such eggs results also in the accretion of a substantial amount of animal-derived ω3 long chain polyunsaturated fatty acids (C20-C22) and in more than 50% reduction in arachidonic acid, comparatively to eggs avalaible on the market.

Another aspect of the present invention is related to a feed composition of exclusive vegeterian origin in order to obtain from poultry, in particular layers, such eggs, said composition being a wild-type diet containing no animal fats and satisfying the equation of Huyguebaert et al. (Arch. Geflügelk (1995) 59(2), p.145-152) exposed hereafter and comprising 4 to 10% (w:w) of total fat, seed ω6 and green ω3 plant-type fatty acids contributing to total fat content in steadily decreasing manner from respectively 40 to 15% and 50 to 30%, when total fat increases from 4 to 10%, the ω6:ω3 essential fatty acid ratio being in favour of the green ω3 plant type fatty acids and decreasing concomitantly from 0.8 to 0.5.

Preferably the feed composition according to the invention comprises about 30 to 40% carbohydrates, about 10 to 20% proteins, about 10 to 15% moisture, about 7 to 12% ash and about 4 to 10% fats, the total being 100%, for a total metabolisable energy of about 2800 kcal. The total comprises also addition of vitamin A, vitamin D3, vitamin E, menadione sodium bisulfite, riboflavine, panthothenic acid, niacine, vitamin B6, folic acid, biotin, thiamin, vitamin B12 and oligo-elements (Mn, Zn, Fe, Cu, I, Se, Co, Ca), the preferred composition being the one described in the table 9.

The present invention is also related to a feeding method of poultry, in particular layers, comprising the step of feeding poultry with the—feed composition according to the invention in order to readjust the ω6:ω3 ratio in eggs, so that they present an improved balanced fatty acids composition according to the invention.

A last aspect of the present invention is related to a food composition comprising, as a food ingredient, the whole egg, the egg white or the egg yolk of the eggs according to the invention, especially a food composition suitable for human consumption, including a functional food.

The present invention will be described in more details in the following detailed description of the invention and in the following examples.

DETAILED DESCRIPTION OF THE INVENTION

Designing the Feed

The best feeding option would be the natural, wild-type one, whereupon the bird grazes on greens and leaves and collects insects and worms in a wild, "fight-or-flight" environment.

However, this method of production is not compatible with the growing need of an ever-expanding world population and economy. Greens are essentially source of α-linolenic acid that is formed from linoleic acid in plant chloroplasts as a result of energy transfer from sunlight to chemical π-bonds. Given that the lipid fraction of green leaves account for about 1% of their total mass and that about 50% fatty acids therein are α-linolenic acid, one can calculate that a normal 100-g portion leaves provides 0.5 g α-linolenic acid. This is far from negligible when compared to the low concentration of this particular fatty acids in most edible seeds and oils, but total fat content (±1%) is much too low to sustain a continuous process of egg production (an economically-viable way to produce healthy eggs at reasonable cost on a world-wide basis).

Within the group of green lipids, fits a unique exception from seeds in the name of flax seeds. Flax or linseeds are indeed an exceptional source of plant ω3 fatty acids otherwise found in much smaller amounts and higher ω6:ω3 ratio in soya and canola seeds (table 7). Flaxseeds are also readily available at competitive world market price for feed ingredients. In this sense, flax seeds represent a unique source of green plant-type lipids which is contained within a seed in substantial quantities and at reasonable cost.

TABLE 7

| ω3-containing greens, flaxseeds and Designer Feed (% of triglycerides) | | | | | |
|---|---|---|---|---|---|
| Vegetable | SAFA | MUFA | PUFA | | |
| plant | — | ω7 + ω9 | ω6 | ω3 | ω6:ω3 |
| Cabbage, red | 25 | 5 | 30 | 40 | 0.75 |
| Designer Feed | 12 | 18 | 25 | 45 | 0.58 |
| Parsley | 18 | 3 | 26 | 54 | 0.48 |
| Lettuce | 18 | 3 | 17 | 44 | 0.38 |
| Cabbage, white | 18 | 8 | 15 | 58 | 0.26 |
| Flax seeds | 9 | 18 | 15 | 57 | 0.26 |
| Cauliflower | 22 | 15 | 13 | 50 | 0.26 |
| Brussels sprouts | 20 | 5 | 12 | 63 | 0.19 |
| Spinach | 12 | 3 | 8 | 52 | 0.16 |

Huygebaert (Arch. Geflügelk (1995) 59(2), p.145-152) has developed a mathematical model for the prediction of the fat composition in egg, in particular C16-C18, based on their respective contribution to total fat in the feed (table 8).

TABLE 8

| Response in the egg yolk fat (%) | | | | | | |
|---|---|---|---|---|---|---|
| y | Intercept | $x_1$ | $x_2$ | $(x_1)^2$ | $(x_2)^2$ | $x_1 x_2$ |
| C16:0 | 26.60 | −1.462 | 0.191 | 0.0348 | −0.0046 | 0.028 |
| C18:0 | 7.94 | −0.178 | −0.121 | 0.0069 | 0.0029 | 0.010 |
| C18:1 | 41.70 | −2.637 | 0.378 | 0.0464 | −0.0005 | 0.042 |
| C18:2 | −9.26 | 2.559 | 0.322 | −0.1311 | −0.0011 | 0.026 |
| C18:3 | −0.03 | 0.311 | −0.016 | −0.0202 | 0.0031 | 0.023 |

$x_1$: dietary fat level-%;
$x_2$: the level-% of the respective characteristic in the dietary fat.

Therefore, this models predicts for example that a concentration y of C16:0 fatty acids in the eggs can be obtained if the diet given to the poultry contains a concentration $x_1$ of dietary fat and a concentration $x_2$ of C16:0 fatty acids, the concentration y being calculated as follows:

$$y=26.60-1.462x_1+0.191x_2+0.0348(x_1)^2-0.0046(x_2)^2+0.028x_1x_2$$

This model has been shown to be valid for the continuous production of wild-type eggs as defined, if the feed composition given to poultry comprises 4 to 10% (w:w) of total fat, seed ω6 and green ω3 plant-type fatty acids contributing to total fat content in steadily decreasing manner from 40 to 15% and from 50 to 30%, respectively, and ω6:ω3 essential fatty acid ratio being in favour of the green ω3 plant type fatty acids and decreasing from 0.8 to 0.5. More precisely, the fat composition (ω6:ω3=Polyunsaturated:Saturated=1:1) of the wild-type egg has been maintained constant for several months (>18 months) under a defined feeding regimen.

Groups of 30,000 Isabrown birds were fed with a wild-type diet containing no animal fat, 35.5% carbohydrates, 17% protein, 12% moisture, 10.25% ash and 6.5% fat for a total of 2,800 Kcal metabolisable energy (M.E.). The detailed composition of the feed is given in Table 9.

TABLE 9

Composition of Designed Feed

| Raw Material Inclusion | (%) |
|---|---|
| Avizym 2300 - 20% | 0.50 |
| Choline - 75% | 0.05 |
| Limestone gran. | 8.29 |
| Layer supplement | 0.25 |
| Salt | 0.20 |
| Dical. Phos. | 1.26 |
| D, L-methionine - 40% | 0.28 |
| Course wheat | 47.5 |
| Course peas | 10.0 |
| Wheat middlings | 2.785 |
| Soya 50 / Hypro | 15.33 |
| Sunflower meal 30 profat | 6.0 |
| Lucern 20 ® (350) | 2.53 |
| Subtotal (DSF) | 95.0 |
| Vegetable oil (DM) | 5.0 |
| Total | 100 |

| Analysis | (%) |
|---|---|
| Protein | 17.0 |
| Fat | 6.5 |
| Carbohydrate | 35.5 |
| Moisture | 12.0 |
| Ash | 10.25 |
| M.E. | 2,800 Kcal |

| (%) | Total (%) | Digestible |
|---|---|---|
| Ca | 3.7 | — |
| P | 0.58 | 0.32 |
| Lys | 0.89 | 0.74 |
| Met | 0.38 | 0.34 |
| Cys + Met | 0.68 | 0.57 |
| Thr | 0.61 | 0.49 |
| Trp | 0.20 | 0.165 |
| Lys/(Cys + Met) | | 1.30 |

Layer supplement provides the following per kilogram of diet: vitamin A, 10,000 I.U.; vitamin D3, 2,000 I.U.; vitamin E, 10 I.U.; menadione sodium bisulfite, 0.6 mg; riboflavin, 5 mg; pantothenic acid, 10.9 mg; niacin, 40 mg; vitamin B6, 1 mg; folic acid, 0.5 mg; biotin, 20 μg; thiamine, 1 mg; vitamin B12, 20 μg; Mn, 75 mg; Zn, 55 mg; Fe, 35 mg; Cu, 7.5 mg; I, 1.9 mg; Se, 0.1 mg; Co, 0.7 mg, Ca, 330 mg; Mg, 55 mg.

Vegetable oil is cold-pressed flax seed oil (BS 6900: sediment, max. 0.25%; Iodine Value, min. 175; Acid Value, max. 4 mg KOH/g, Peroxide Value, max. 10, Colour Gardner, max. 13) stabilised with 0.4% Rendox (Kemin) containing BHA (E320), Ethoxyquin (E324), Citric Acid (E330), phosphoric acid (E338), mono- & diglycerides of fatty acids (E471), and enriched with 0.2% dl-α-tocopherol (Roche).

Designing the Wild-Type Egg

The composition of fatty acids in egg yolk lipids can be modulated through dietary means. Especially, the ω3 fatty acid of plant origin (α-linolenic acid) can be incorporated at the expenses of saturated and monounsaturated fatty acids in the triglyceride fraction. Typically, regular eggs would contain almost undetectable level (<1%) of α-linolenic acid whilst free wandering birds grazing on greens and worms would almost incorporate 13% of α-linolenic and show a balanced ω6:ω3 ratio in the triglyceride fraction. Nutritionally, this change into the birds diet does not affect the way these lipids are metabolised in the body since α-linolenic acid is usually burned and incorporated into tissues and cells membrane lipids at the same rate as monounsaturated fatty acids. A clear sign that this is indeed so is the fact that most α-linolenic acid, when present in the yolk triglyceride fraction, is located at position sn-1/3, characteristic of non-essential fatty acids, however, it provides a unique back-up source of ω3 fatty acids in fat depots for the synthesis of DHA through the fatty acids cascade pathway.

The major change associated with the presence of α-linolenic in the wild birds diet is the ratio inversion of the animal derived long-chain polyunsaturated fatty acids in the phospholipid fraction of the yolk. Whilst regular feed contributes to the accretion of arachidonic acid at the expenses of docosahexaenoic acid (AA:DHA=2:1), the wild-type feed favours the synthesis and deposition of docosahexaenoic acid (AA:DHA=1:3).

Characteristics of Wild-Type Eggs Obtained with the Designed Feed

Fatty Acid and Lipid Compositions of Wild-Type Eggs Compared to Those of Standard Eggs After 3 weeks induction on Designer Feed, wild-type eggs can be followed for their fatty acid pattern. A validation study ran on five groups of hens during 19 months has allowed to establish a specification for the wild-type egg (table 10), as follows:

TABLE 10

Fatty acid and lipid composition of wild-type eggs

| | % rel. |
|---|---|
| Fatty acids | |
| C16:0 | 19.34 ± 0.71 |
| C18:0 | 9.18 ± 0.88 |
| C16:1ω7 | 3.17 ± 0.42 |
| C18:1ω9 | 37.74 ± 1.45 |
| C18:2ω6 | 13.59 ± 0.76 |
| C18:3ω3 | 11.69 ± 1.26 |
| C20:4ω6 | 0.81 ± 0.14 |
| C20:5ω3 | 0.28 ± 0.06 |
| C22:5ω3 | 0.43 ± 0.10 |
| C22:6ω3 | 1.86 ± 0.39 |
| Lipids | |
| Σ (SAFA) | 28.5 ± 1.1 |
| Σ (MUFA) | 40.9 ± 1.7 |
| Σ (PUFA) | 28.7 ± 1.6 |
| P/S | 1.00 ± 0.08 |

TABLE 10-continued

Fatty acid and lipid composition of wild-type eggs

| | % rel. |
|---|---|
| ω6:ω3 | 1.01 ± 0.07 |
| ω6:ω3 LCP | 0.32 ± 0.03 |
| *C20:4ω6 | 35 ± 5 mg |

*Content of arachidonic acid (AA, C20:4ω6) calculated as % rel. × 4,200 mg fatty acids per 50-g egg edible portion.

During the same period, standard eggs available on the market and obtained from Europe, the United States, South and East Asia were collected and analysed according to the same procedure for their fatty acid and lipid contents. Results show that standard eggs substantially deviate from wild-type egg (table 11). In particular, standard eggs are extremely poor (max. 1%) in plant-type ω3 fatty acids and, as a consequence, they are also much richer in arachidonic acid.

TABLE 11

Fatty acid and lipid composition of standard eggs

| | % rel. |
|---|---|
| Fatty acids | |
| C16:0 | 22.63 ± 2.32 |
| C18:0 | 8.37 ± 0.75 |
| C16:1ω7 | 3.26 ± 0.89 |
| C18:1ω9 | 41.5 ± 3.30 |
| C18:2ω6 | 17.03 ± 4.06 |
| C18:3ω3 | 0.66 ± 0.37 |
| C20:4ω6 | 2.03 ± 0.30 |
| C20:5ω3 | 0.01 – 0.02 |
| C22:5ω3 | 0.13 ± 0.05 |
| C22:6ω3 | 1.03 ± 0.40 |
| Lipids | |
| Σ (SAFA) | 31.0 ± 2.5 |
| Σ (MUFA) | 44.8 ± 3.7 |
| Σ (PUFA) | 20.9 ± 4.6 |
| P/S | 0.68 ± 0.18 |
| ω6:ω3 | 12.03 ± 5.0 |
| ω6:ω3 LCP | 2.06 ± 1.0 |
| *C20:4ω6 | 85 ± 15 |

*Content of arachidonic acid (AA, C20:4ω6) calculated as % rel. × 4,200 mg fatty acids per 50-g egg edible portion.

Other eggs, often declared as ω3 docosahexaenoic acid enriched, were analysed in detail for their fatty acids distribution. These eggs are normally obtained from hens fed with a docosahexaenoic acid oil-enriched feed (fish oil, algae, single cell oil, etc.) and their content of this specific fatty acid is relatively higher than in other eggs. It also turned out that such eggs exhibit a fatty acid composition reminiscent to that of standard eggs in terms of their low content in wild-type plant ω3 fatty acids (max. 1%) and their high content in domestic-type animal-derived ω6 long-chain fatty acids, not withstanding the additional fact that, when animal-derived ω3 fatty acids were summed up, they had less of these than the wild-type egg obtained with an exclusive vegetarian diet.

Stability of Wild-Type Eggs Compared to that of Standard Eggs

Wild-type eggs, naturally rich in ω3 fatty acids, may be assumed less stable than modern ω6-rich eggs. Nutritionists and consumers may raise more specific concerns towards fatty acids and cholesterol peroxidation in wild-type eggs.

a. Stability with Hen's Age

Fatty acid changes with hen's age. The influence of hen's age on ω3 long-chain phospholipids content in wild-type eggs was followed on the life-cycle of two independent groups of 30,000 birds each. The data show that although a very slight trend down is observed, the effect of age on fatty acid composition in wild-type eggs is minor (table 12).

TABLE 12

Content of ω3 long-chain phospholipids in wild-type egg as a function of hen's age

| Week | Σ ω3 LCP (%) |
|---|---|
| Group 1 | |
| 38 | 2.62 |
| 43 | 2.49 |
| 46 | 2.62 |
| 49 | 2.53 |
| 52 | 2.45 |
| 56 | 2.31 |
| 60 | 2.28 |
| 70 | 2.53 |
| m ± σ | 2.48 ± 0.15 |
| Group 2 | |
| 26 | 2.59 |
| 31 | 2.77 |
| 34 | 2.75 |
| 44 | 2.35 |
| 48 | 2.41 |
| 56 | 2.67 |
| 61 | 2.45 |
| m ± σ | 2.57 ± 0.15 |

Σ ω3 LCP (%) as sum of EPA + DPA + DHA b. Stability with Egg's Age

Fatty acid changes with egg's age. Wild-type eggs were analysed for their fatty acid composition (from Fatty Acid Methyl Ester (FAME) spectrum analysis) 3 and 9 weeks after being laid and stored at room temperature (21° C.). After 9 weeks, the yolk were barely separable from the white. The most obvious change upon storage is in the level of docosahexaenoïc acids (−9%/3 weeks, −18%/6 weeks and −27%/9 weeks at 21° C.). All other fatty acids were kept at a remarkable constant level (table 13).

TABLE 13

Changes in fatty acid composition of wild-type egg with age

| Fatty acids | % rel. | | |
|---|---|---|---|
| | Fresh | 3-w | 9-w |
| C16:0 | 18.48 | 18.72 | 18.50 |
| C18:0 | 8.72 | 8.16 | 8.45 |
| C16:1ω7 | 3.29 | 3.58 | 3.38 |
| C18:1ω9 | 39.96 | 40.05 | 39.66 |
| C18:2ω6 | 13.17 | 13.60 | 14.19 |
| C18:3ω3 | 11.00 | 11.10 | 11.14 |
| C20:4ω6 | 0.74 | 0.77 | 0.79 |
| C20:5ω3 | 0.25 | 0.22 | 0.24 |
| C22:5ω3 | 0.42 | 0.31 | 0.33 |
| C22:6ω3 | 1.86 | 1.69 | 1.36 |

| Lipids | % rel. | | |
|---|---|---|---|
| | Fresh | 3-w | 9-w |
| Σ (SAFA) | 27.2 | 26.9 | 26.9 |
| Σ (MUFA) | 43.2 | 43.6 | 43.0 |

TABLE 13-continued

Changes in fatty acid composition of wild-type egg with age

| Σ (PUFA) | 27.4 | 27.7 | 28.0 |
|---|---|---|---|
| P/S | 1.01 | 1.03 | 1.04 |
| ω6:ω3 | 1.03 | 1.08 | 1.15 |
| ω6:ω3 LCP | 0.29 | 0.35 | 0.41 |
| *C20:4ω6 | 31.1 | 32.3 | 33.2 |

*Content of arachidonic acid (AA, C20:4ω6) calculated as % rel. × 4,200 mg fatty acids per 50-g egg edible portion. Ref. Anal. Malvoz 97-05-05 c. Stability with Processing Temperatures

Fatty acid changes with processing temperatures. Both wild-type and standard eggs were tested for their stability against oxidation during typical culinary practices, i.e., boiling (hard eggs) and baking (cake and baked custard) (tables 14 & 15) and compared.

TABLE 14

Changes in fatty acid composition of wild-type egg upon cooking

| Fatty acids | % rel. | | | |
|---|---|---|---|---|
| | Fresh | Boiled | Cake | Custard |
| C16:0 | 18.48 | 18.34 | 17.97 | 18.81 |
| C18:0 | 8.72 | 8.49 | 8.48 | 8.78 |
| C16:1ω7 | 3.29 | 3.17 | 2.00 | 3.04 |
| C18:1ω9 | 39.96 | 37.9 | 37.00 | 37.68 |
| C18:2ω6 | 13.17 | 14.1 | 16.56 | 14.68 |
| C18:3ω3 | 11.00 | 12.64 | 12.20 | 11.48 |
| C20:4ω6 | 0.74 | 0.74 | 0.71 | 0.71 |
| C20:5ω3 | 0.25 | 0.26 | 0.21 | 0.18 |
| C22:5ω3 | 0.42 | 0.44 | 0.42 | 0.42 |
| C22:6ω3 | 1.86 | 1.74 | 1.76 | 1.83 |

TABLE 15

Changes in fatty acid composition of standard egg upon cooking

| Fatty acids | % rel. | | | |
|---|---|---|---|---|
| | Fresh | Boiled | Cake | Custard |
| C16:0 | 22.51 | — | 22.64 | 22.97 |
| C18:0 | 8.11 | — | 7.63 | 8.57 |
| C16:1ω7 | 3.46 | — | 3.27 | 3.52 |
| C18:1ω9 | 40.32 | — | 40.13 | 41.74 |
| C18:2ω6 | 17.84 | — | 19.87 | 15.74 |
| C18:3ω3 | 0.79 | — | 1.48 | 0.69 |
| C20:4ω6 | 2.18 | — | 1.80 | 1.90 |
| C20:5ω3 | 0.01 | — | 0.03 | 0.02 |
| C22:5ω3 | 0.17 | — | 0.13 | 0.13 |
| C22:6ω3 | 1.16 | — | 1.02 | 0.97 |

These results show that the fatty acid composition of fresh and cooked wild-type and standard-type eggs are identical within the limit of accuracy.

d. Setting Upon Boiling

The rates of setting of the eggs upon boiling were also compared between standard and wild-type eggs. Eggs were bored in order to have a hole in the shell at the apical side where the air chamber lies (without perforing it) and were boiled for various time (8 to 12 min.) in hot water (min. 400 ml per egg). At the end of the incubation, eggs were rapidly cooled in a large volume of cold water and stored one night in the fridge. The day after, the eggs were peeled and sliced in twice. The appearance of the yolk in standard and wild-type eggs was compared. No difference in rate of setting could be assigned at any time between the two types of eggs.

Cholesterol Content in Wild-Type Eggs Compared to Standard Eggs

Wild-type and standard eggs were boiled, cooled, dried and peeled. The white was separated from the yolk and the cholesterol content in the yolk was determined. Based on the weight of the different fractions (intact egg, shell & membranes, albumen, yolk), the amount of cholesterol in 100-g egg edible portion of wild-type and standard eggs was calculated (table 16).

TABLE 16

Cholesterol in wild-type and standard eggs

| | Standard eggs (a) | Wild-type eggs (b) |
|---|---|---|
| Total weight (g) | 63.0 ± 7.0 | 65.8 ± 5.4 |
| Shell & membranes (g) | 7.0 ± 0.5 | 7.3 ± 0.8 |
| Albumen (g) | 39.3 ± 2.70 | 40.2 ± 4.3 |
| Yolk (g) | 17.8 ± 1.9 | 18.2 ± 2.0 |
| Yolk (g/% edible) | 31.2 ± 3.2 | 31.3 ± 2.9 |
| Cholesterol/yolk (%) | 216 ± 24 | 217.8 ± 28 |
| Cholesterol (mg/g yolk) | 12.2 ± 1.0 | 12.0 ± 1.0 |
| Cholesterol/egg (mg/% edible) | 380 ± 45 | 375 ± 45 |

(a) 26 analyses, (b) 45 analyses - all confirmed by two independent laboratories.

The cholesterol content of both standard eggs and wild-type eggs is around 375±45 mg/%, of the edible part. In other words, the cholesterol of the wild-type eggs according to the invention is not changed as compared to the one of standard-type eggs.

Vitamin E Content in Wild-Type Eggs Compared to Standard Eggs

Among the antioxidants present in eggs, vitamin E plays an essential role in stabilising the lipids against oxidation and rancidity. Wild-type eggs, richer in sensitive ω3 fatty acids, are advantageously enriched with vitamin E in order to avoid peroxidation of cholesterol and other lipid fractions. Designer feed is enriched with 0.2% dl-α-tocopherol acetate in order to maintain 10 mg vitamin E per 50-g edible egg (table 17).

TABLE 17

Vitamin E content (mg/%) in wild-type eggs compared to standard-type eggs

| | Standard | Wild-type | | | | | |
|---|---|---|---|---|---|---|---|
| Egg tested | Egg N° 1 | Egg N° 2 | Egg N° 3 | Egg N° 4 | Egg N° 5 | Average* |
| α-tocopherol | 6.2 | 18.7 | 23.9 | 19.8 | 19.3 | 20.4 ± 0.2 |
| γ-tocopherol | 2.1 | 2.03 | 1.9 | 2.15 | 2.3 | 2.1 ± 0.2 |

*(mg/%) a 50-g egg edible portion contains min. 10 mg vitamin E.

Lysozyme Content in Wild-Type Eggs Compared to Standard Eggs

The effect of changing dietary lipids on hen's capacity to produce essential active enzymes and proteins for the protection of eggs against invasion by pathogens was tested by measuring the amount of lysozyme present in wild-type egg as compared to that in standard eggs (table 18).

TABLE 18

Lysozyme content in Standard and Wild-type eggs

| Lysozyme | Standard type | Wild type |
|---|---|---|
| mg/g dry matter albumen | 32.4 ± 1.3 | 33.5 ± 1.5 |

21 analyses on each type egg, from layers of 42 to 65 weeks of age for standard eggs and from layers of 32 to 55 weeks of age for wild-type eggs.

As seen, the amount of lysozyme contained in the wild-type egg is similar to the one contained in standard eggs.

Nutritional Make-Up of the Wild-Type Egg to Human

Egg lipids are made of fat store lipids (triglycerides, TG) and structural lipids (phospholipids, PL and cholesterol, CHL). These occur in egg yolk in a constant specific ratio (TG:PL:CHL=16:6:1). Most fatty acids are concentrated in the triglyceride and the phospholipid fractions whilst cholesterol is almost totally (90-95%) unesterified. Fatty acids in the two fractions are not randomly distributed: essential fatty acids are mostly present at position sn-2 of the triglyceride and the phospholipid fractions whilst non-essential fatty acids (FA) occur at position sn-1/3 of the triglyceride fraction and at position sn-1 of the phospholipid fraction.

The distribution of fatty acids in egg yolk lipids drives their postpandrial influence on blood lipids. In the digestive tract, they are hydrolysed by pancreatic 1,3-lipase and 2-phospholipase to free fatty acids, sn-1,3 monoglycerides and sn-2 lysophospholipids, respectively. Their reconstitution in the intestinal enterocytes results into the formation of triglycerides bearing essential fatty acids at position sn-2 and, among others, long-chain polyunsaturated fatty acids at position sn-1,3. Triglycerides with essential fatty acids at position sn-2 are known to have hypocholesterolaemic effect in human whilst long-chain polyunsaturated fatty acids at position sn-1,3 of blood triglycerides are directly available for tissue incorporation through their release by endothelial 1,3-lipase. The bioavailability of egg yolk long-chain polyunsaturated fatty acids is similar to that of those from other animal tissues and must be very similar to that of endogenously produced long-chain polyunsaturated fatty acids.

Prophylactic Effects of Egg Lipids

Given that egg yolk long-chain polyunsaturated fatty acids are extremely bio-available for incorporation into tissue- and circulating cells membrane lipids and that their $\omega 6:\omega 3$ ratio is susceptible to changes through dietary means, it is interesting to assess the influence of the bird's diet on the healthiness of the eggs destined to human consumption.

Egg lipids contain small amounts (less than 20% of total fatty acids content) of short and medium chain (C12-16) fatty acids. Their location at position sn-1/3 of TG and sn-1 of PL makes them available for direct energy production or for storage in adipose tissue. Monounsaturated fatty acids and polyunsaturated fatty acids present at position sn-2 of triglycerides contribute to the hypocholesterolaemic effect of egg lipids. Long-chain polyunsaturated fatty acids located at position sn-2 of PL's are available for tissue incorporation.

Seen as a food lipid vector, egg is ranking high in the range of dietary fats (dairy and meat produces, vegetable and fish oils). Fish oil is often reckoned as a good source of $\omega 3$ long-chain polyunsaturated fatty acids. However, two-third of long-chain polyunsaturated fatty acids in fish oil are associated with the sn-2 position of the TG which makes them less bio-available and more susceptible to be diluted in fat depots and thus more prone to oxidative deterioration. It has been recommended to take large amount of vitamin E supplements together with fish oil.

As compared to regular eggs that are almost totally depleted of the wild-type plant linolenic acid (linolenic acid (LnA)<1%; ratio linoleic acid: α-lineolenic acid (LA:LnA)>30:1), wild-type eggs supply these two essential fatty acids in a balanced ratio (LA:LnA=1:1) and contribute to the endogenous synthesis of long-chain polyunsaturated fatty acids via the fatty acids biological cascade in the liver. The absence of α-linolenic acid in the regular diet of layers also leads to the preferential accretion of arachidonic acid in egg yolk phospholipids (($\omega 6:\omega 3$ LC-PUFA=2:1) whilst this ratio is inverted in wild-type eggs ($\omega 6:\omega 3$ LC-PUFA=1:3). Direct incorporation of dietary long-chain polyunsaturated fatty acids in tissues and circulating cells is-thus in favour of $\omega 3$ long-chain polyunsaturated fatty acids with the wild-type eggs.

It is known that the effect of $\omega 3$ fatty acids on serum cholesterol concentration is similar to those of other unsaturated fatty acids (monounsaturated and $\omega 6$ polyunsaturated), i.e., when they replace C12-16 saturated fatty acids at the sn-2 position of triglycerides, they lower serum cholesterol. $\omega 3$ long-chain polyunsaturated fatty acids have an added benefit of consistently lowering serum triglyceride concentration through reduction of chylomicron and VLDL secretion by the intestine and the liver, respectively.

When fed to selected groups of people, the eggs according to the invention have been shown to indeed contribute to the improvement of: (a) circulating cell membranes fatty acid composition ($\omega 3:\omega 6$ long-chain polyunsaturated fatty acids ratio), (b) blood lipid distribution (no statistical change in blood cholesterol level, improved distribution within blood lipoproteins—HDL/LDL balance, substantial reduction in the amount of fat circulating in the blood), (c) blood pressure (5 to 10% reduction in both cystolic and diastolic pressure) and, even (d) breast milk lipid composition (60% and 300% increase in α-linolenic acid and docosahexaenoic acid, respectively, with no substantial changes in other fatty acids).

Finally, through this feeding practice of the chicken, it has been feasible to readjust the $\omega 6:\omega 3$ ratio in eggs so that they present a balanced fatty acid composition comparable to the original "wild-type food" available to early man. As a lipid source, the egg according to the invention thus belongs to the minor family of $\omega 3$-rich fats and oils and lies in between those from vegetable and fresh water fish origins (Table 19).

TABLE 19

$\omega 3$-containing seeds, fish oils compared to wild-type egg
(% of triglycerides)

| Vegetable/fish lipid source | SAFA | MUFA $\omega 7 + \omega 9$ | PUFA $\omega 6$ | $\omega 3$ | $\omega 6:\omega 3$ |
|---|---|---|---|---|---|
| Wheat germ | 20 | 18 | 55 | 7 | 8 |
| Soybean | 16 | 22 | 54 | 7.5 | 7 |
| Walnut | 11 | 15 | 62 | 12 | 5 |
| Canola | 7 | 63 | 20 | 10 | 2 |
| Egg according to the invention | 30 | 40 | 13 | 13 | 1 |
| Salmon | 20 | 30 | 5 | 5 | 1 |
| Trout | 25 | 30 | 6 | 6 | 1 |

The eggs according to the invention and river fish deliver a minimum of 70% unsaturated fatty acids (the healthy one), equal amounts of both $\omega 6$ and $\omega 3$ polyunsaturated fatty acids (ω6:ω3=1:1) and substantial amounts of animal-derived ω3 long-chain polyunsaturated fatty acids in a favourable ratio (ω6:ω3=1:3) (table 20).

TABLE 20

ω3 LC-PUFA in the egg according to the invention and river fish

| ω6:ω3 | PUFA | LC-PUFA |
|---|---|---|
| Egg according to the invention | 1.03 | 0.35 |
| Salmon | 0.98 | 0.32 |
| Trout | 0.92 | 0.20 |

Furthermore, the eggs according to the invention are also characterised by advantageous organoleptic properties in terms of freshness and flavour. They are rich in vitamins and antioxidants and are produced from layers effectively maintained immunised against Salmonella infections through the diet according to the invention they receive, said diet being rich in oligosaccharides naturally present in green and leaves.

LIST OF ABBREVIATIONS

P: polyunsaturated fatty acid
S: saturated fatty acid
M: monounsaturated fatty acid
AA: arachidonic acid
EFA: essential fatty acid
FA: fatty acid
LC-MUFA: long-chain monounsaturated fatty acid
LC-PUFA: long-chain polyunsaturated fatty acid
LCP: long-chain polyunsaturated fatty acid
PUFA: polyunsaturated fatty acid
MUFA: monounsaturated fatty acid
SAFA: saturated fatty acid
EPA: eicosapentaenoic acid
DHA: docosahexaenoic acid
DPA: docosapentaenoic acid
LnA: α-linolenic acid
LA: linoleic acid
CHL: cholesterol
CSI: cholesterol-saturated fat index
TG: triglyceride
PL: phospholipid
VLDL: very low density lipoprotein
HDL: high density lipoprotein
LDL: low density lipoprotein
ω3 fatty acids: fatty acids having first unsaturation on carbon 3 from the terminal methyl, as known by the man skilled in the art
ω6 fatty acids: fatty acids having first unsaturation on carbon 6 from the terminal methyl, as known by the man skilled in the art

The invention claimed is:

1. An egg laid by a domesticated bird, wherein the bird is an egg-layer, having a lipid fraction balanced in ω6 and ω3 fatty acids according to the ratio of C18:2 and C20:4 ω6 fatty acids/C18:3, C20:5, C22:5, and C22:6 ω3 fatty acids=1:1±10% and having a lipid fraction balanced between polyunsaturated and saturated fatty acids according to the ratio of C18:2, C18:3, C20:4, C20:5, C22:5, and C22:6 polyunsaturated/C16:0 and C18:0 saturated fatty acids =1:1±10%; and characterized in that its phospholipid fraction is balanced according to the ratio of animal-derived ω6 fatty acids/animal-derived ω3 fatty acids=1:3 +/− 10%.

2. The egg according to claim 1, balanced in plant-type and animal-derived ω3 fatty acids according to the ratio of plant-type ω3 fatty acids/animal ω3 fatty acids=5:1±10%.

3. An egg according to claim 1, comprising plant-type ω3 fatty acids in a concentration comprised between 450 and 600 mg/egg.

4. The egg according claim 1, whose animal-derived ω3 fatty acids account for more than 90 mg/egg and whose composition comprises C20 & C22 ω3 fatty acids.

5. The egg according to claim 1, which contains no more than 40 mg/egg of animal-derived ω6 fatty acids, and which is essentially arachidonic acid.

6. The egg according to claim 1, which contains no more than 2.5 g saturated fatty acids and 375 mg cholesterol.

7. A food composition comprising, as a food ingredient, the whole egg, the egg white or the egg yolk of the egg according to claim 1.

8. The egg according to claim 4, wherein the C20 and C22 fatty acids are selected from the group consisting of eicosapentaenoic acid, docosapentaenoic acid and docosahexaenoic acid.

9. The food composition according to claim 7, wherein the food composition is for consumption by humans.

* * * * *